Aug. 13, 1963  W. J. STARK  3,100,542
JET SHOT HOLE DEVICE
Filed May 1, 1959  2 Sheets-Sheet 1

William J. Stark  Inventor

By John D. Gassett  Attorney

Aug. 13, 1963 W. J. STARK 3,100,542
JET SHOT HOLE DEVICE
Filed May 1, 1959 2 Sheets-Sheet 2
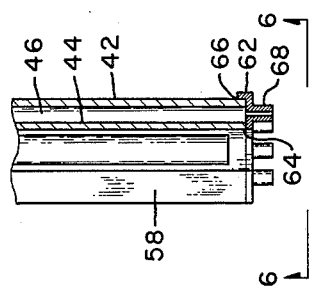
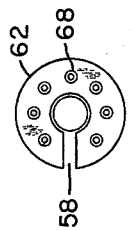
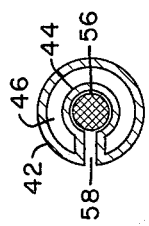
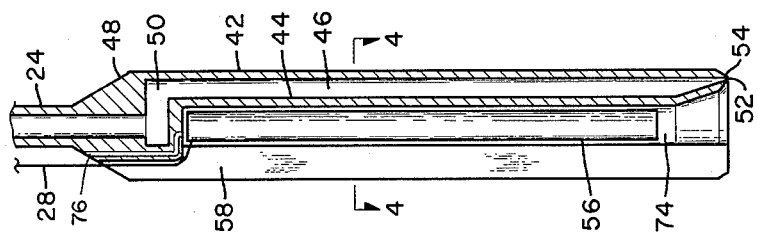
William J. Stark  Inventor
By John D. Dassett  Attorney

United States Patent Office 3,100,542
Patented Aug. 13, 1963

3,100,542
JET SHOT HOLE DEVICE
William J. Stark, Tulsa, Okla., assignor to Jersey Production Research Company, a corporation of Delaware
Filed May 1, 1959, Ser. No. 810,455
9 Claims. (Cl. 175—1)

This invention relates to seismic exploration. It is especially related to a system for drilling or cleaning out a seismic shot hole and is further related to the placing of an explosive charge in a seismic shot hole.

In conventional seismic prospecting, a seismic shot hole is drilled into the surface of the earth. An explosive charge, which may be dynamite, is normally placed in the bottom of a shot hole and detonated. If desired, the shot or charge may be positioned above the bottom of the shot hole. After the explosive charge has been detonated, energy therefrom travels downwardly in the earth until it encounters discontinuities and the waves are then transmitted back to the surface of the earth where they are detected by seismic transducers, commonly known as geophones. The shot hole is usually drilled through the upper layer of earth known as the weathered layer, which has a relatively low velocity for the transmission of wave energy therethrough. In other words, it is normally desired to place the explosive charge in the sub-layer, which is just below the weathered layer and has a relatively much higher velocity for transmission of energy than does the weathered layer. In order to place the explosive charge in the sub-layer then, shot holes are frequently drilled in excess of one hundred feet.

Quite frequently, it is desired to set off a second charge in the same shot hole. In conventional systems, prior to loading the hole for the second time, or after a charge has been detonated therein, a weight is dropped into the hole. If the weight drops free, then the hole is safe to be reloaded. That is, the dynamite can be tamped to the bottom of the hole. If the weight does not drop free, it indicates that there is an obstruction or bridge in the hole and, of course, the charge cannot be run to the bottom of the hole until the obstruction is removed.

Various means are employed to remove the obstruction and to let the trapped gas, which may have accumulated below the obstruction, escape before the explosive charge is placed in the shot hole. One such method is the use of tamp rods which are run into the seismic shot hole by hand in an attempt to tamp or break up the obstruction. Tamp rods normally have an enlarged section on the lower end thereof, which is used to tamp the plugged section. Great care must be exercised to avoid possible injury in case the obstruction is blown out by an accumulation of gas. In many cases the tamping action packs the mud tighter, and completely plugs the hole. Therefore, a new hole must be drilled, or the drilled hole may be redrilled. This, of course, is costly and time consuming. After the obstruction has been removed, the tamp and tamping rods are taken from the hole. Thereafter, the charge is lowered into position; usually it is necessary to put the explosive charge on the lower end of a tamp rod and force it down manually. In other words, an attempt is made in one operation to clean the shot hole and a second operation is required to lower the charge into position.

It is, therefore, clear that there is a definite need for an improved system for removing any obstruction or bridge which may develop in a shot hole. It is also clear that a system permitting the simultaneous placing of a charge in the shot hole with the cleaning out operation would also be advantageous. This present invention provides such an improved system.

Accordingly, one object of the invention is to provide an improved system for removing obstructions or mud plugs from seismic shot holes.

Another object of the present invention is to provide a system for the placing of an explosive charge in the shot hole.

In the system of the present invention, tamp rods and tamps are not used. Briefly, this invention includes a flexible conduit with a jet means attached to the lower end thereof. A jet stream is directed downwardly from the jet against the obstruction, thus jetting away the materials of the obstruction in the shoe hole. The materials thus jetted away are carried upwardly in the bore hole by the return stream of fluid. In a preferred embodiment, an explosive charge is releasably carried by the jet means. After the obstruction in the shot hole has been cleared away, the jet means and explosive charge are further lowered to the bottom of the shot hole, or any intermediate point, as desired. The jet means is then removed from the well bore and the explosive charge is left suspended in the shot hole at the desired position. It is thus seen that the obstruction is then removed and the explosive charge is placed at the desired position in the bore hole in one operation. The explosive charge is then ready to be detonated.

Various other objects and a better understanding of the invention will be apparent from the following description taken in conjunction with the drawings which:

FIG. 3 illustrates one embodiment of a jet means;

FIG. 4 illustrates a section along the line 4—4 of FIG. 3;

FIG. 5 illustrates a preferred embodiment of a jet means; and

FIG. 6 illustrates a view taken along the line 6—6 of FIG. 5.

Figure 2:
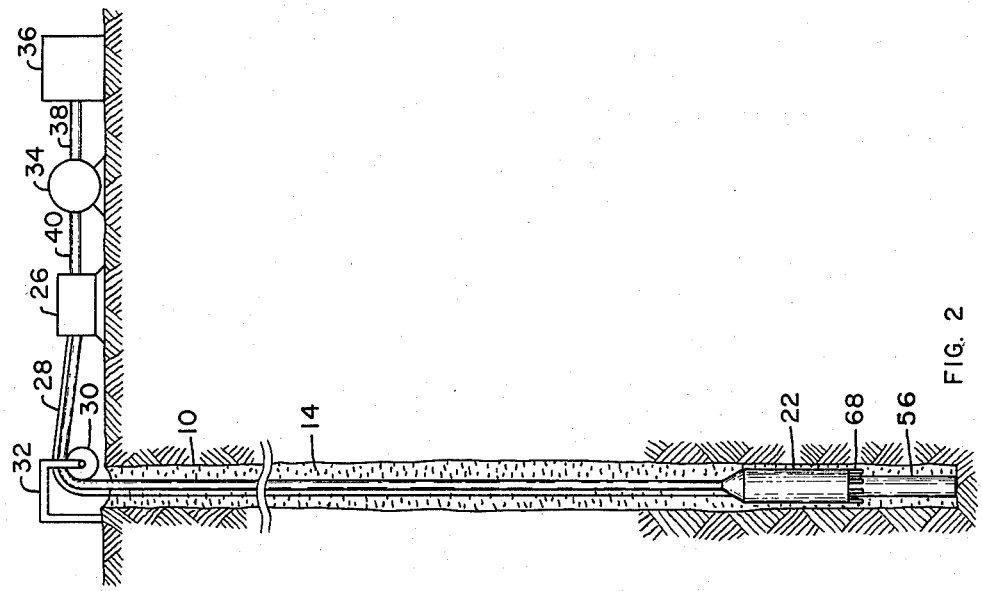
FIG. 2 illustrates in schematic form an embodiment similar to FIG. 1, except that the obstruction in the shot hole of FIG. 1 has been removed and an explosive charge is being positioned in the shot hole.
Figure 1:
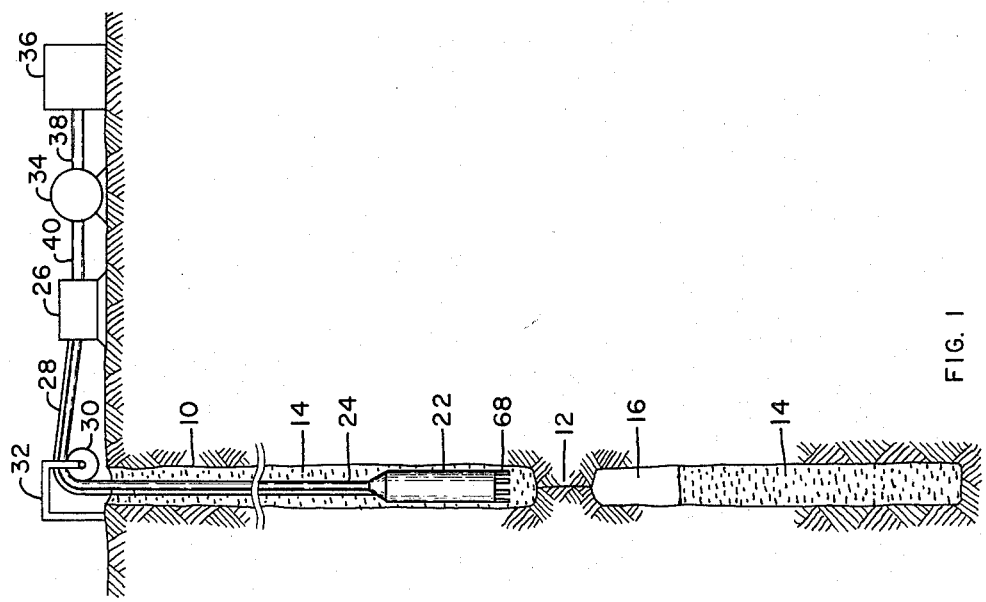
FIG. 1 illustrates in schematic form one embodiment of this apparatus suspended in a shot hole having an obstruction therein.

Referring to the drawing, especially FIG. 1 and FIG. 2, there is illustrated a shot hole 10 in which an obstruction or plug 12 has been formed, either by cave-in of natural causes before or after the explosive charge has been detonated, or as a result of such explosion. It is well to note at this point that normally after a shot hole has been drilled, it is left at least partially filled with water or a heavy drilling mud of some type. This drilling mud is indicated by reference numeral 14 and is seen to be separated in FIG. 1 by obstruction 12 and a gas pocket 16 which has formed just below obstruction 12.

In FIG. 1 there is illustrated shot hole 10 in which container means 22 having jet means 68 has been suspended at the lower end of flexible conduit 24. The jet means is shown as being suspended just above obstruction 12. Flexible conduit 24 can be reeled in or out of a conventional reeler 26. A suitable reeling device is described in U.S. Patent No. 2,670,926, issued March 2, 1954. A supporting conducting cable 28 for supporting and detonating an explosive charge carried within container means 22 is preferably reeled in and out of reeling means 26 with flexible conduit 24. The pulley 30 and pulley support 32 supports conduit 24 and cable 28 in shot hole 10.

Pumping means 34 is fluidly connected to fluid reservoir 36 by conduit 38. The discharge side of pump 34 is fluidly connected to flexible conduit 24 through conduit 40. Reeler 26 is of a character to raise or lower jet pump 24, as desired.

Attention is next directed to FIG. 3, which illustrates one embodiment of the apparatus. This includes an outer cylinder 42 and an inner cylinder 44 with an annular space 46 therebetween. The upper ends of cylinders 42 and 44 are enclosed by cap means 48 which has a passage 50 which provides fluid communication between conduit 24 and annular space 46. Conduit 24 is also of a character to support the weight of pump 22. Annular space 46 opens into jet means 52. Jet means 52 may conveniently be formed by flaring the lower end of inner cylinder 44 so as to form jet nozzle 54. If desired, a conduit 76 may be provided between the upper exterior end of pump 22 and chamber 74 which is formed within inner cylinder 44.

An explosive charge 56 is conveniently carried in chamber 74. Explosive charge 56 is also conveniently supported by conductor cable 28. The flow of fluid through chamber 74 and out conduit 76 and slot 58 also aids in keeping charge 56 in chamber 74. As shown more clearly in FIG. 4, slot 58 is provided for conducting cable 28. As can be seen, slot 58 permits charge 56 and supporting conductor cable 28 to remain in a bore hole while container means 22 is removed therefrom.

The best mode contemplated for the design of the jet means is illustrated in FIG. 5. An annular jet plate 62 encloses the lower end of annular space 46 and may be attached to inner cylinder 44 and outer cylinder 42, as by welds 64 and 66. A plurality of jet nozzles 68 in the form of spikes extend downwardly from jet plate 62. These nozzles are preferably about 2 inches long and about 1/16 inch in inside diameter. The outside diameter of outer cylinder 42 is approximately, or slightly less, than the diameter of the shot hole to be cleaned out. The outside diameter of the inner cylinder 44 is preferably about 1/2 inch less than the inner diameter of outer cylinder 42. A convenient length for the jet pump has been found to be about three feet. FIG. 6 shows a bottom view of the jet pump of FIG. 5, and shows one arrangement of jet nozzles 68.

Having thus described the structural features of this apparatus, attention is now directed to one mode of operation thereof. For the purpose of this explanation, it will be assumed that obstruction 12, shown in FIG. 1, is blocking shot hole 10 and that it is desired to place explosive charge 56 at a point beneath obstruction 12. It is thus apparent that obstruction 12 must be removed. Container means 22, which is attached to flexible conduit 24, is loaded with an explosive charge 56 which, in turn, is supported by conductor cable 28. Conduit 24 and cable 28 are preferably reeled from the same reeling means in order that charge 56 and jet pump 22 may be lowered simultaneously at the same rate so that they will not become separated. Conductor cable 28 and flexible conduit 24 are then placed over pulley 30 and are lowered into the shot hole. When contains means 22 reaches the obstruction 12, pump 34 is started and water, which is normally the fluid to be used, is pumped downwardly to flexible conduit 24 through the jet nozzles 68. If desired, pump 34 may be started at the same time that the device is started to be lowered; it is believed that the jet action of nozzles 68 aids in the downward movement of the apparatus through the "drilling mud" in the hole. The compacted mud or other obstruction material of obstruction 12 is torn out and washed away by the action of the jet stream. Obstruction 12 is then seen to be removed and the shot hole is opened. In this system, there is no need for personnel to be directly above the shot hole. Therefore, if the hole being cleaned out has previously been shot and the bridge or obstruction blows out by the accumulation of gas underneath, there is no danger of injury to personnel.

When explosive charge 56 has been placed at the desired position, conductor cable 28 is removed from reeling means 26. This can be accomplished in the conventional manner such as, for example, by holding flexible conduit 24 and releasing the tension on reeling means 26 so that conductor cable 28 can be removed therefrom. The tension is then placed back on reeling means 28 holding conductor cable 24. Flexible conduit 24 is then reeled in and the container 22 thus removed from the shot hole. As conductor cable 28 is removed from the reeling means 26, explosive charge 56 remains at the desired shot point location in the shot hole and is supported therein by conductor cable 28. As container means 22 is removed from the well bore in this instance, it is seen that conductor 28 passes through slot 58. After removal of the apparatus, the shot or charge is ready for detonation when desired. It is thus seen that the shot hole has been cleaned out and the explosive charge placed in position with one "trip" or lowering of the apparatus.

To those skilled in the art, it is obvious that many modifications and variations in this invention may be made without departing from the spirit and scope thereof. Therefore, only such limitations should be imposed as indicated by the appended claims.

What is claimed is:

1. An apparatus for use in drilling or cleaning seismic shot holes in the earth's surface, which comprises: a flexible conduit; concentric cylinders with an annular space formed between the inner wall of the outer cylinder and the outer wall of the inner cylinder; cap means closing the upper ends of said inner cylinder and at least partially closing the upper end of the annular space formed between the inner wall of the outer cylinder and the outer wall of the inner cylinder and attachable to said conduit, said cap means having a passage means establishing fluid communication between the interior of said conduit and said annular space; an annular plate enclosing the lower end of said annular space; downwardly projecting jet nozzles on the bottom side of said annular plate, said nozzles being in fluid communication with said annular space.

2. An apparatus as defined in claim 1, in which a slot has been provided through the walls of said cylinders and said annular plate, said slot being blanked off from the annular space.

3. An apparatus as defined in claim 1 in which means are provided for releasably retaining an explosive charge within said inner cylinder.

4. An apparatus as defined in claim 1 in which means are provided for forcing a fluid through said conduit.

5. An apparatus as defined in claim 1 in which means are provided for lowering and raising said conduit.

6. An apparatus as defined in claim 1 in which a passage means is provided establishing fluid communication between the upper interior of said inner cylinder and the upper exterior of said cap means.

7. An apparatus for use in drilling or cleaning seismic shot holes in the earth's surface which comprises: a flexible conduit; concentric cylinders with an annular space formed between the inner wall of the outer cylinder and the outer wall of the inner cylinder; cap means closing the upper end of said inner cylinder sufficiently such that an explosive charge can be contained therein and at least partially closing the upper end of the annular space between the concentric cylinders, said cap means being attachable to said conduit; passage means establishing fluid communication between the interior of said conduit and said annular space; and jet means supported from the lower ends of said cylinders and being in fluid communication with said annular space.

8. An apparatus as defined in claim 7 for use in placing an explosive charge in a shot hole, in which means are provided for releasably retaining the explosive charge within said inner cylinder.

9. An apparatus as defined in claim 7 in which a passage means is provided between the upper interior of said inner cylinder and the upper exterior of said cap means.

References Cited in the file of this patent

UNITED STATES PATENTS

| | | |
|---|---|---|
| 1,396,260 | Davis | Nov. 8, 1921 |
| 1,994,884 | Chew | Mar. 19, 1935 |
| 2,019,719 | Miller | Nov. 5, 1935 |
| 2,618,999 | Scott | Nov. 25, 1952 |
| 2,773,669 | Norman et al. | Dec. 11, 1956 |